(12) United States Patent
Hsieh et al.

(10) Patent No.: US 8,536,791 B2
(45) Date of Patent: Sep. 17, 2013

(54) SOLAR POWER SUPPLY DEVICE

(75) Inventors: Kuan-Hong Hsieh, Tu-Cheng (TW);
Han-Che Wang, Tu-Cheng (TW); Lu Pan, Shenzhen (CN); Xin Zhao, Shenzhen (CN); Zu-Pei He, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 262 days.

(21) Appl. No.: 13/083,590

(22) Filed: Apr. 10, 2011

(65) Prior Publication Data
US 2012/0038282 A1 Feb. 16, 2012

(30) Foreign Application Priority Data
Aug. 11, 2010 (CN) .......................... 2010 1 0250954

(51) Int. Cl.
H05B 37/00 (2006.01)
H05B 37/02 (2006.01)
F21L 4/00 (2006.01)
B60Q 1/00 (2006.01)
H02J 7/00 (2006.01)

(52) U.S. Cl.
USPC ............. 315/86; 315/159; 362/183; 362/192; 320/101

(58) Field of Classification Search
USPC ........... 315/86, 149, 154, 157, 159; 320/101; 362/183, 192
See application file for complete search history.

(56) References Cited

U.S. PATENT DOCUMENTS

| 5,936,380 | A | * | 8/1999 | Parrish | 320/101 |
|---|---|---|---|---|---|
| 6,685,334 | B2 | * | 2/2004 | Kenny et al. | 362/183 |
| 2009/0295234 | A1 | * | 12/2009 | Lu et al. | 307/150 |
| 2011/0018448 | A1 | * | 1/2011 | Metchear et al. | 315/152 |
| 2011/0074334 | A1 | * | 3/2011 | Wang et al. | 320/101 |
| 2011/0157876 | A1 | * | 6/2011 | Wang et al. | 362/183 |

FOREIGN PATENT DOCUMENTS
TW 200951786 12/2009

* cited by examiner

Primary Examiner — Thienvu Tran
(74) Attorney, Agent, or Firm — Altis Law Group, Inc.

(57) ABSTRACT

A solar power supply device includes a solar panel and a rechargeable battery. The solar panel is configured to collect and convert optical energy to electrical energy. The solar power supply device further includes an e-paper display unit, a charging connection connecting to a rechargeable device. A detecting unit detecting the charging state information of the rechargeable device via the charging connection, a light-operated unit detecting ambient illumination intensity, and a processing unit for controlling the e-paper display unit to display charging states information obtained from the detecting unit and the ambient illumination intensity detected by the light-operated unit.

9 Claims, 3 Drawing Sheets

SOLAR POWER SUPPLY DEVICE

BACKGROUND

1. Technical Field

The present disclosure relates to solar power technology, and particularly, to a solar power supply device with e-paper display screen.

2. Description of the Related Art

Many solar power supply devices can power electrical equipment and display simple digital content. In some products, the base of the solar power supply device is separate from the main body of the solar power supply device, and is configured for displaying battery information. However, the base is often single-functioned and adds to the cost.

Therefore, there is room for improvement within the art.

BRIEF DESCRIPTION OF THE DRAWINGS

The components in the drawings are not necessarily drawn to scale, the emphasis instead being placed upon clearly illustrating the principles of a solar power supply device. Moreover, in the drawings, like reference numerals designate corresponding parts throughout the several views.

DETAILED DESCRIPTION

Figure 1:
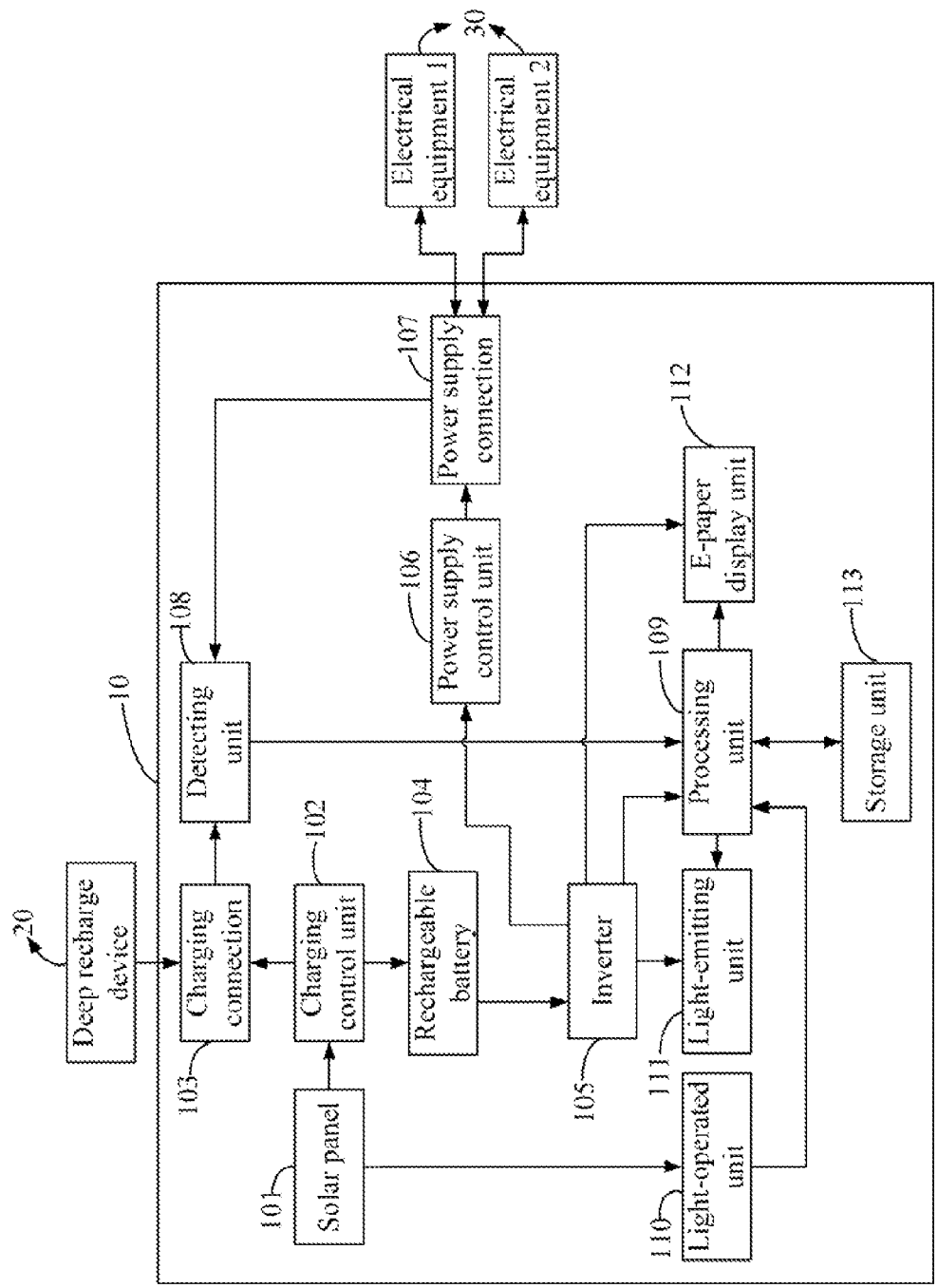
FIG. 1 is a block diagram of a solar power supply device in accordance with an exemplary embodiment.

Referring to FIG. 1, a solar power supply device 10 includes a solar panel 101, a charging control unit 102, a charging connection 103 and a rechargeable battery 104. The solar panel 101 is configured to collect and convert optical energy to electric energy. The charging control unit 102 is connected among the solar panel 101, the charging connection 103, and the rechargeable battery 104, and is configured for controlling the charge to the rechargeable battery 104 or a rechargeable device 20 connected to the charging connection 103 with the electric energy being converted by the solar panel 101. Furthermore, the charging control unit 102 is designed to avoid an over-charging condition and an over-discharge condition of the rechargeable battery 104 and the rechargeable device 20.

The solar power supply further includes an inverter 105, a power supply control unit 106 and a power supply connection 107. The inverter 105 is connected between the rechargeable battery 104 and the power supply control unit 106, and configured for converting the DC voltage provided by the rechargeable battery 104 to AC voltage. The AC voltage is provided to power electronic equipment 30 that is connected to the power supply connection 107. The solar power supply device 10 includes at least one power supply connection 107, and when there are more than one power supply connections 107, the solar power supply device 10 can power all the electrical equipment 30 that is connected to the power supply connection 107 at the same time.

Figure 2:
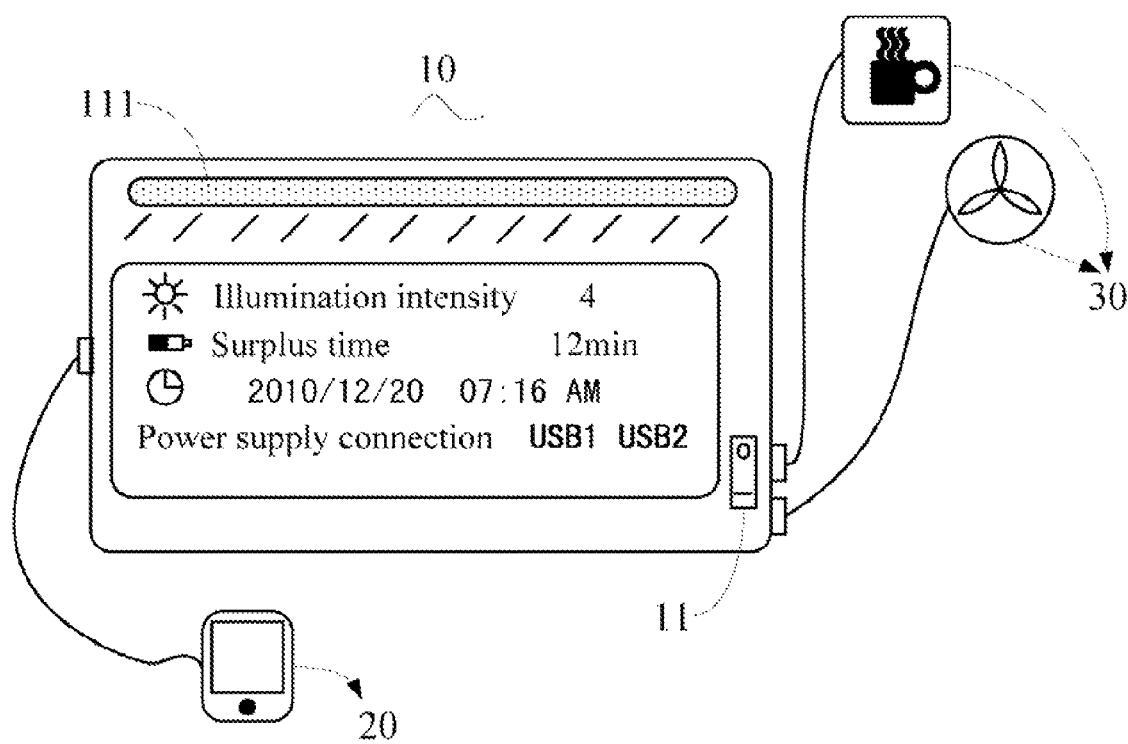
FIG. 2 is a state of use diagram for displaying information on the solar power supply device of FIG. 1.

Also referring to FIG. 2, the solar power supply device 10 further includes a detecting unit 108, a processing unit 109, a light-operated unit 110, a light-emitting unit 111 and an e-paper display unit 112. In the embodiment, the light-emitting unit 111 is a light-emitting diode (LED). The charging connection 103 and the power supply connection 107 are connected to the processing unit 109 via the detecting unit 108.

The detecting unit 108 is configured for detecting the charging state of the rechargeable device 20 via the charging connection 103. The charging state comprises a current electrical level of the rechargeable device 20, and a full electrical level. The processing unit 109 is configured for estimating a surplus charging time of the rechargeable device 20 according to the charging state and a charging rate obtained from the detecting unit 108, and controls the e-paper display unit 112 to display the estimated surplus charging time. Furthermore, the processing unit 109 is configured for controlling the e-paper display unit 112 to display the current charging state of the rechargeable device 20, such as the current electrical level of the rechargeable device 20. The detecting unit 108 is further configured for detecting the status of use of the one or more power supply connections 107. The processing unit 109 controls the e-paper display unit 112 to display names or IDs of the enabled power supply connections 107 according to the determination from the detecting unit 108.

The light-operated unit 110 is connected between the solar panel 101 and the processing unit 109, and is configured for detecting the ambient illumination intensity, and the processing unit 109 controls the e-paper display unit 112 to display the ambient illumination intensity to users. In the meantime, the processing unit 109 compares the ambient illumination intensity with a predetermined reference illumination intensity, and controls it to enable or disable the light-emitting unit 111 according to the compared result. When the ambient illumination intensity exceeds the predetermined reference illumination intensity, the light-emitting unit 111 is disabled. When the ambient illumination intensity does not exceed the predetermined reference illumination intensity, the light-emitting unit 111 is enabled to light the e-paper display unit 112. In the embodiment, the light-emitting unit 111 is mounted on the surface of the solar power supply device 10, right above the screen of the e-paper display unit 112. In another embodiment, the light-emitting unit 111 is mounted on any location around the screen of the e-paper display unit 112.

For an e-paper display unit 112, which lacks a backlight, the predetermined reference illumination intensity is originally set when shipped. The predetermined reference illumination intensity is originally set to assure under any condition, users with the help of the light-emitting unit 111 can view the content on the solar power supply device 10.

In another embodiment, the light-emitting unit 111 also can be enabled and disabled by users who operate a mechanical switch 11 mounted on the solar power supply device 10. When the processing unit 109 detects an operation of enabling the light-emitting unit 111 via the mechanical switch 11, the processing unit 109 automatically updates the predetermined reference illumination intensity with the current illumination intensity detected by the light-operated unit 110.

Figure 3:
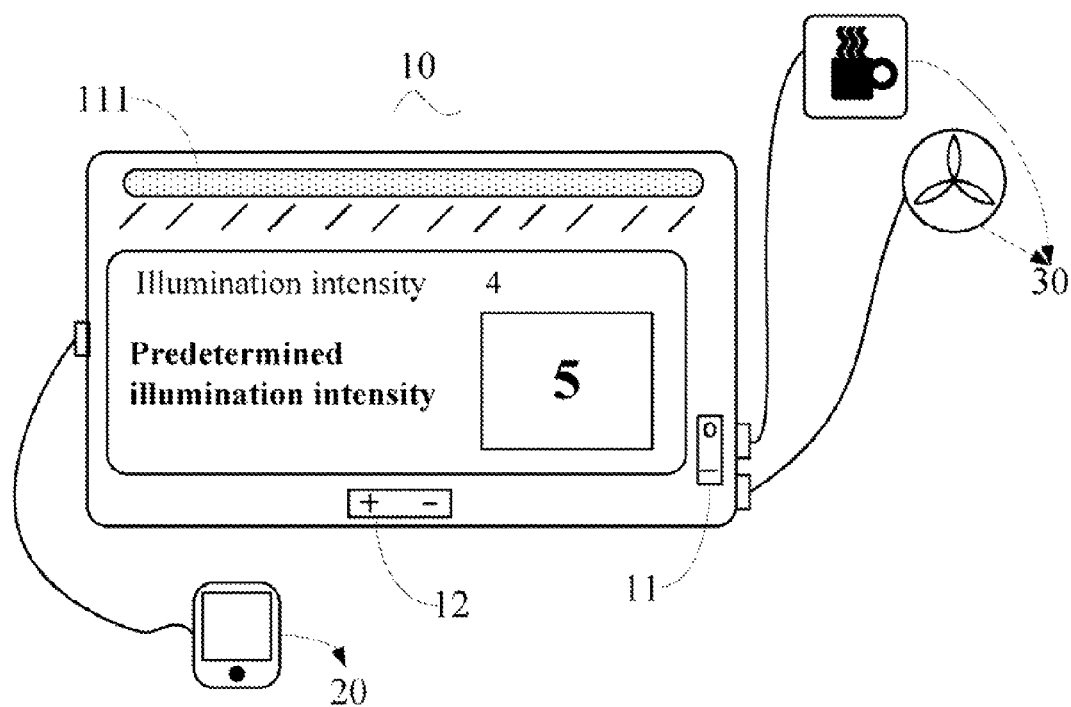
FIG. 3 is a state of use diagram for setting lighting parameter value on the solar power supply device of FIG. 1.

Also referring to FIG. 3, the predetermined reference illumination intensity of the e-paper display unit 112 can be manually set by users. For example, a "+/−" mechanical button 12 is mounted on the solar power supply device 10 for users to adjust (i.e., increase or decrease) the value of the predetermined reference illumination intensity, and the e-paper display unit 112 provides a user interface to feedback the result of an adjustment by the users. In one embodiment, the mechanical button 12 is a rolling button, and rolls the mechanical button 12 toward one direction to increase the predetermined reference illumination intensity, and rolls toward the opposite direction to decrease the predetermined reference illumination intensity. In another embodiment, there are two mechanical buttons 12 mounted on the solar power supply device 10, and one is used to increase the predetermined reference illumination intensity, and the other is used to decrease the predetermined reference illumination intensity.

In another embodiment, the light-emitting unit 111 is also used as an indicator to indicate the one or more charging states of the rechargeable device 20. For example, the light-emitting unit 111 is controlled to flash when the rechargeable device 20 is fully charged.

The e-paper display unit 112 is further used to display such information as time information. A real time clock (not shown) is equipped in the e-paper display unit 112 to provide time information. The e-paper display unit 112 and the solar panel 101 are mounted on the same side of the solar power supply device 10, or on the opposite side when needed.

The solar power supply device 10 further includes a storage unit 113. The storage unit 113 is configured to store digital content, such as pictures, or documents. The processing unit 109 reads the digital content stored in the storage 113, and controls the e-paper display unit 112 to display the digital content.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A solar power supply device, comprising:
   a solar panel configured to collect and convert optical energy to electric energy;
   a rechargeable battery;
   an e-paper display unit;
   a charging connection configured for connecting to a rechargeable device;
   a detecting unit configured for detecting charging states of the rechargeable device via the charging connection;
   a light-operated unit configured for detecting ambient illumination intensity; and
   a processing unit configured for controlling the e-paper display unit to display charging states obtained from the detecting unit and the ambient illumination intensity detected by the light-operated unit; the processing unit further configured for estimating a surplus charging time of the rechargeable device according to the charging state and a charging rate obtained from the detecting unit, and controlling the e-paper display unit to display the estimated surplus charging time.

2. The solar power supply device as recited in claim 1, further comprising:
   a charging control unit configured for controlling to charge the rechargeable battery and a rechargeable device connected to the charging connection with the electric energy converted by the solar panel;
   an inverter configured for converting the DC voltage provided by the rechargeable battery to AC voltage;
   a power supply connection configured for connecting to an electrical equipment;
   a power supply control unit configured for controlling the AC voltage to power an electrical equipment that is connected to the power supply connection; and
   a storage unit configured for storing digital content, wherein the processing unit reads the digital content stored, and controls the e-paper display unit to display the digital content.

3. The solar power supply device as recited in claim 1, further comprising a light-emitting unit configured for illuminating the e-paper display unit;
   wherein the processing unit is further configured for comparing the ambient illumination intensity value with a predetermined reference illumination intensity, and controlling to enable or disable the light-emitting unit according to the compared result.

4. The solar power supply device as recited in claim 3, wherein when the ambient illumination intensity exceeds the predetermined reference illumination intensity, the light-emitting unit is disabled; when the ambient illumination intensity does not exceed the predetermined reference illumination intensity, the light-emitting unit is enabled to light the e-paper display unit.

5. The solar power supply device as recited in claim 3, wherein the light-emitting unit is further used as an indicator to indicate particular ones of the charging states of the rechargeable device.

6. The solar power supply device as recited in claim 3, further comprising a mechanical switch provided for users to manually enable or disable the light-emitting unit.

7. The solar power supply device as recited in claim 6, wherein the processing unit is further configured for updating the predetermined reference illumination intensity with the current illumination intensity detected by the light-operated unit when the users manually enable the light-emitting unit.

8. The solar power supply device as recited in claim 3, further comprising a button provided for users to manually set and adjust the predetermined reference illumination intensity.

9. The solar power supply device as recited in claim 8, wherein the e-paper display unit provides a user interface to feedback results of setting and adjustment by users to the predetermined reference illumination intensity.

* * * * *